A. R. PRIBIL.
SHEET METAL GEAR CASE.
APPLICATION FILED AUG. 3, 1917.

1,386,026.

Patented Aug. 2, 1921.
3 SHEETS—SHEET 1.

WITNESSES:
Felix C. Rodgers
O. W. Kennedy

INVENTOR
Alexis R. Pribil
BY
Wesley G. Carr
ATTORNEY

A. R. PRIBIL.
SHEET METAL GEAR CASE.
APPLICATION FILED AUG. 3, 1917.

1,386,026.

Patented Aug. 2, 1921.
3 SHEETS—SHEET 2.

WITNESSES:
Felix C. Rodgers.
O. W. Kennedy

INVENTOR
Alexis R. Pribil
BY
Wesley J. Carr
ATTORNEY

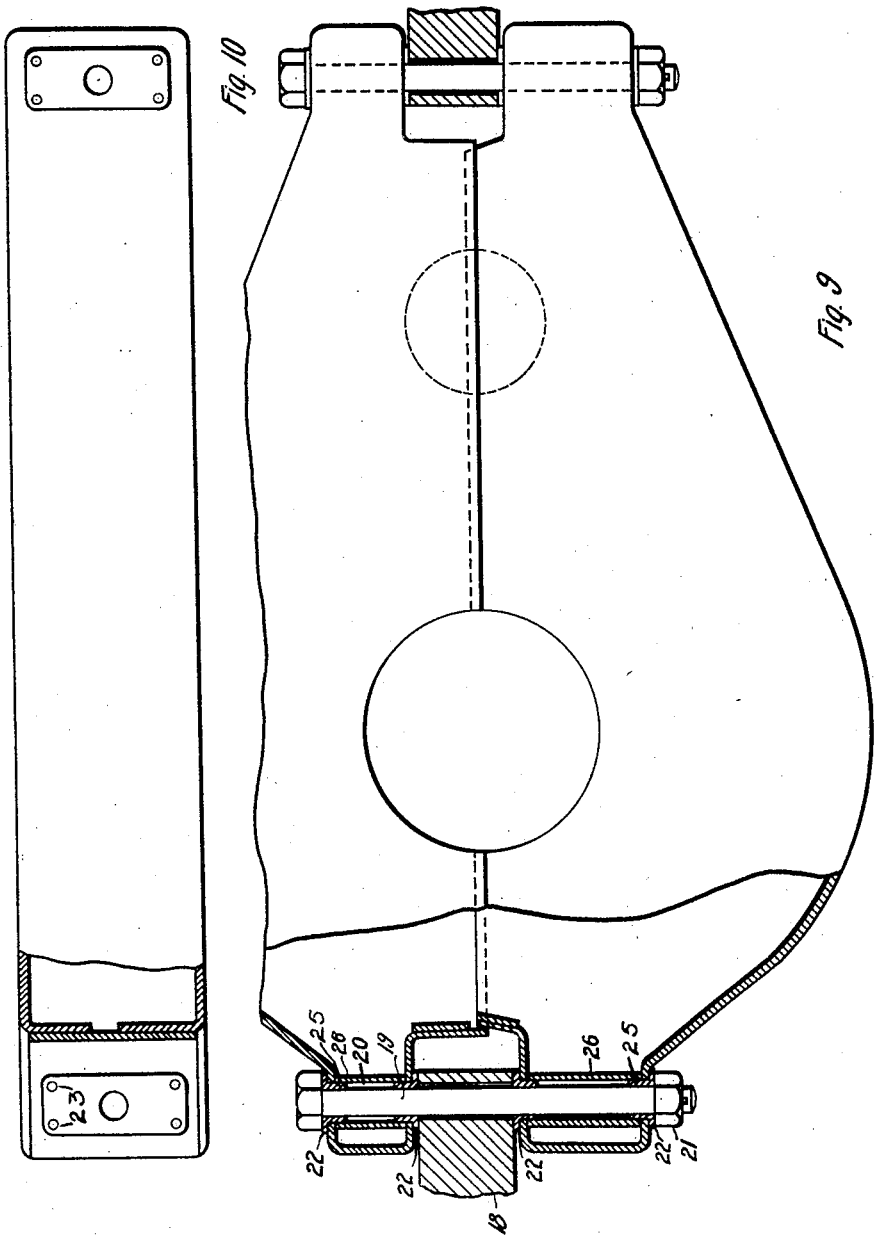

UNITED STATES PATENT OFFICE.

ALEXIS R. PRIBIL, OF CLEVELAND, OHIO, ASSIGNOR TO WESTINGHOUSE ELECTRIC & MANUFACTURING COMPANY, A CORPORATION OF PENNSYLVANIA.

SHEET-METAL GEAR-CASE.

1,386,026.  Specification of Letters Patent.  Patented Aug. 2, 1921.

Application filed August 3, 1917. Serial No. 184,234.

*To all whom it may concern:*

Be it known that I, ALEXIS R. PRIBIL, a citizen of the United States, and a resident of Cleveland, in the county of Cuyahoga and State of Ohio, have invented a new and useful Improvement in Sheet-Metal Gear-Cases, of which the following is a specification.

My invention relates to gear cases that are adapted to inclose the reduction gears which are usually interposed between the motor shafts and the driving axles of electrically propelled vehicles or other machines.

In a copending application of C. W. Starker and Gustav L. S. Kronfeld, 61,084, filed Nov. 12, 1915, and assigned to the Westinghouse Electric & Manufacturing Company, is shown and described a gear case, each member of which is formed by drawing and bending various portions of a suitable sheet metal blank.

The object of my invention is to provide improvements in gear-case members in accordance with the above-mentioned copending application, whereby the manufacture thereof is facilitated.

A further object of my invention is to provide means for bracing those portions of the gear-case members that are subjected to strains during the operation of the machine to which the gear case is attached.

Figure 1:
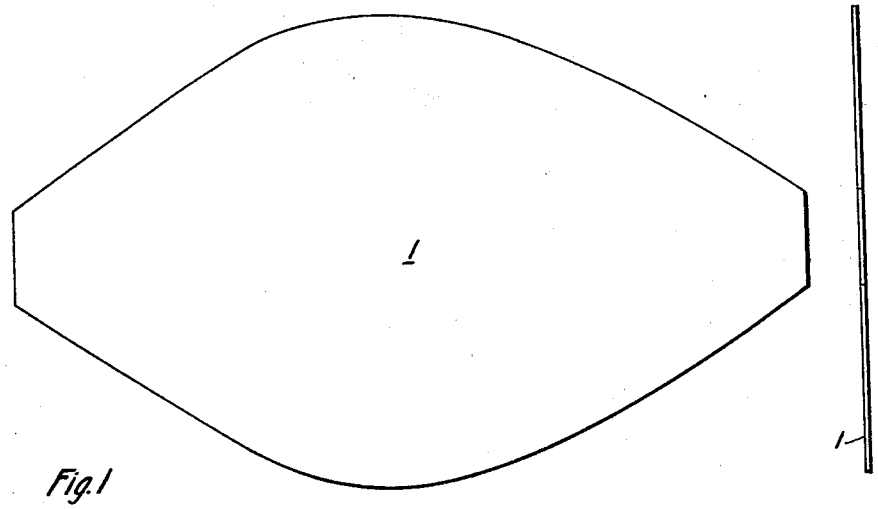
Figure 2:
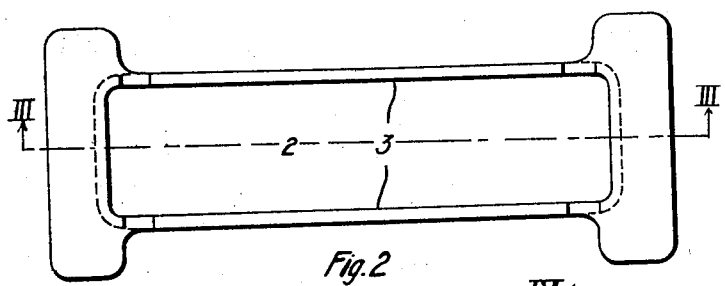
Figure 3:
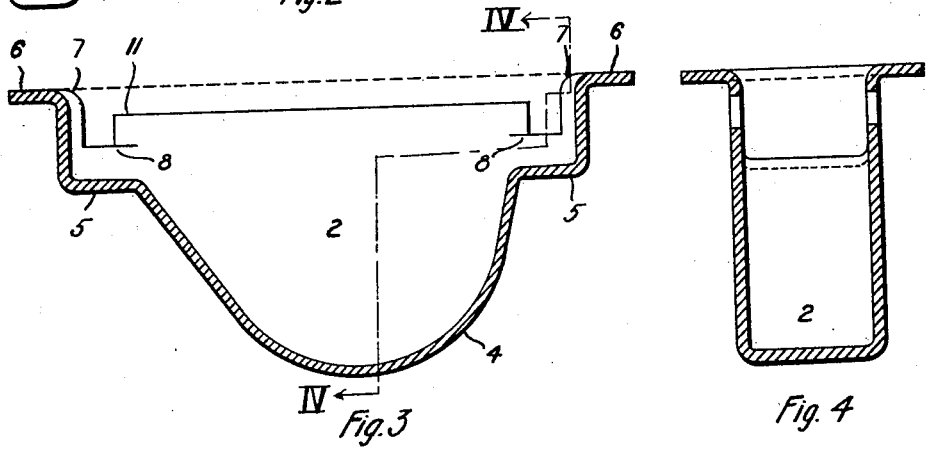
Figure 4:
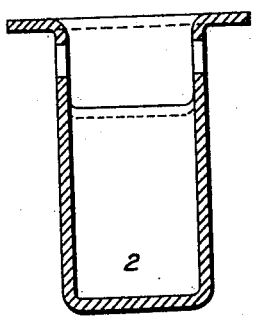
Figure 5:
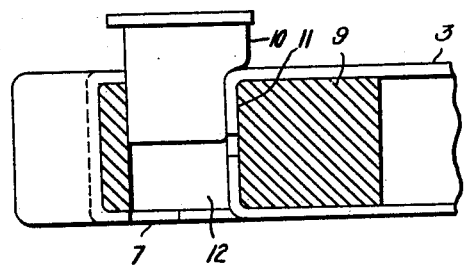
Figure 6:
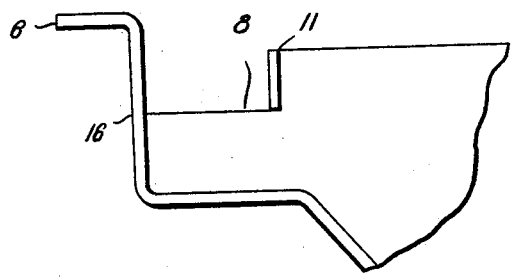
Figure 7:
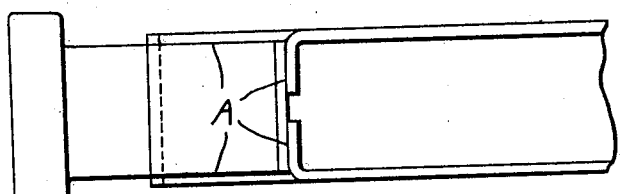
Figure 8:
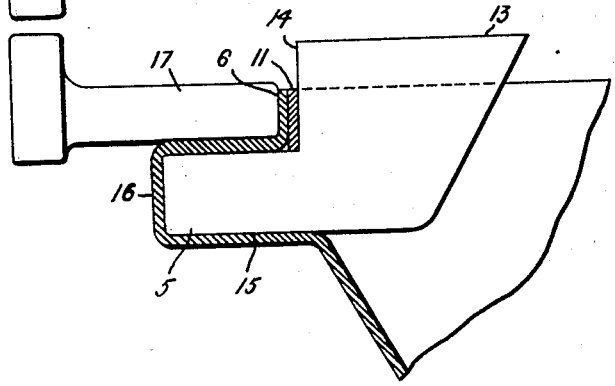

In the accompanying drawing, Figure 1 is a plan view of a sheet-metal blank before being subjected to the first operation in forming a gear case in accordance with my invention. Fig. 2 is a plan view of the blank after the first drawing operations; Fig. 3 is a longitudinal sectional view along the line III—III of Fig. 2; and Fig. 4 is a transverse sectional view along the line IV—IV of Fig. 3; Fig. 5 is an enlarged plan view of a portion of the member shown in Fig. 2, showing a die and a bending tool applied thereto; Fig. 6 is a transverse sectional view of the blank shown in Fig. 5, after the bending operation; Fig. 7 is a plan view, similar to Fig. 5, after the next bending operation; Fig. 8 is a sectional view, similar to Fig. 6, showing portions of the die and tool used in connection with the next bending operation, Fig. 9 is a view, partially in section and partially in side elevation, of a pair of completed gear-case members assembled together, and Fig. 10 is a plan view of the parts shown in Fig. 9.

In forming a gear-case member in accordance with my invention, a blank 1 is punched from sheet metal and is preferably shaped as shown in Fig. 1. This particular shape has been found to approximate the most economical form of the blank before the first drawing operation although it may be understood that the blank 1 may have a somewhat different shape, if found desirable. The blank 1 is then placed in a suitable die and a portion thereof is subjected to the action of a drawing tool to form a trough 2. The form of the blank 1 after the drawing operation is shown clearly in Figs. 2, 3 and 4, the waste portions of the blank, indicated in dotted lines in Figs. 2 and 3, having been removed by suitable means. The trough 2 is of varying depth and generally comprises side walls 3 and a curved bottom portion 4. The trough further comprises straight end portions 5 of uniform depth which terminate in laterally extending flanges 6. Portions of the side walls of the end portions 5 are then punched out to form notches 7 and slits 8 that are continuous with the bottoms of the notches which are made in the side walls adjacent thereto.

Referring now to Figs. 5, 6, 7 and 8, a bending die 9, which is rectangular in cross-section, as illustrated in Fig. 5, is inserted in one of the end members and a bending tool 10 is applied to the portion 11 of a side wall 3 above the slit 8. The bending tool 10 enters a transverse slot 12 that is provided in the die 9 and forces the portion 11 into the slot 12 until it engages the face of the die 9. The portion 11 is then substantially at right angles to the side wall 3. The tool 10 is then withdrawn and reversed after which the corresponding wall portion 11 is bent into alinement with the previously bent portion 11, as indicated in dotted lines.

The blank is now in the form shown in Fig. 6. A die 13 is then inserted in one of the end portions 5, with a working face 14 in engagement with the bent-over portions 11. The die 13 further comprises a projecting portion 15 which extends below the bent-over portions 11 and engages a portion of the end wall 16 of the portion 5.

A forming tool 17 is then applied to the portion of the end wall 16 that is located above the portion 15 of the die 13. As the tool 17 moves in the direction of the arrow, it draws portions of the end wall 16 and of the flange 6, respectively, over the projecting portion 15 of the die 13 and finally bends the remainder of the flange 6 upwardly into engagement with the previously bent portions 11. The die 13 and the tool 17 are now applied to the other end of the blank, as described above. The engaging surfaces of the bent-in portions 11 and of the flange 6 are then welded together, as are also the abutting edges of the side walls 3 and of the bent-over end walls 16, as indicated at A, so that the blank 1, in its final form, presents a substantially unitary structure. Each gear-case member is formed in accordance with the above-described method and then comprises an open trough 2 and closed-in end portions or projections 5. A pair of gear-case members are assembled, one upon the other, as shown in Fig. 9, and are secured together upon suitable supporting members 18, such as extensions from the frames of an electric motor, by bolts 19 extending through alined openings 20 that are provided in the portions 5 and nuts 21 coacting therewith. Wearing plates 22 are secured to the top and bottom of each end portion 5 by rivets or spot welds 23 and each of which is provided with a centrally located opening that is surrounded by an annular flange 25 which is seated within the opening 20 and projects beyond the edges thereof. Tubular spacing members 26 are located within the end portions 5 and are retained in coaxial relation with the openings 20 by the flanges 25. The spacing members 26 fit closely between the respective top and bottom portions of the end portions 5 and, together with the wearing plates 22 reinforce the gear case at the points where it is supported.

From the foregoing, it is apparent that, by the practice of my invention, gear case members may be readily formed from a sheet-metal blank by a relatively few simple operations, and that members so formed will be substantially unitary structures that will be entirely oil and water-tight, owing to the absence of any riveted joints. Furthermore, the use of the wearing plates and spacing members in connection with the end portions relieves the top and bottom portions thereof of any strains that might be transmitted through the bolts and prevents possible collapse of the end portions when the nuts 21 are applied to the bolts 19.

While I have shown my invention as applied to a particular form of blank and as being produced by a certain number of separately performed operations, it is apparent that certain of the operations may be combined without departing from the method and to produce the same result, and I desire, therefore, that only such limitations shall be imposed thereon as come within the scope of the appended claims.

I claim as my invention:

1. A gear-case member comprising a one-piece trough portion of varying depth and having relatively shallow end portions, corresponding portions of the side walls of said trough extending inwardly toward each other, and other portions of the trough projecting over to close the said end portions and to engage the said inwardly extending portions.

2. A gear-case member comprising a one-piece trough portion of sheet metal, the said trough being of varying depth and having relatively shallow end portions, opposite portions of the side walls of said trough extending inwardly into alinement with each other, and other portions of the trough projecting over to close the said end portions and to engage the said inwardly extending portions.

3. A gear-case member comprising a one-piece trough portion of sheet metal, the said trough being of varying depth and having relatively shallow end portions, notched portions in the side walls of said end portions being extended inwardly toward each other, and other portions of the trough being extended over to close the said end portions and to engage the said inwardly extending portions of the side walls.

4. A gear-case member comprising a one-piece trough of varying depth and having relatively shallow end portions, notched portions of the side walls of said end portions extending inwardly toward each other, and other portions of the trough being extended over to close that portion of the trough below said notched portions and the inwardly extending portions of the side walls.

5. A gear-case member comprising a one-piece trough portion of varying depth and having relatively shallow end portions the end walls of which are provided with longitudinally extending flanges, corresponding portions of the side walls of said end portions extending inwardly toward each other and portions of the end walls and their flanges extending over to engage the said inwardly extending portions of said side walls and to close the said end portions.

6. A gear-case member comprising an open trough of varying depth having a closed-in end portion and means for preventing relative movement between the top and bottom of said end portion.

7. A gear-case member comprising an open trough of varying depth having a closed-in end portion and a spacing member located within said end portion for preventing relative movement between the top and bottom thereof.

8. A gear-case member comprising an open trough of varying depth having a closed-in end portion, the top and bottom of which are provided with alined openings and wearing plates having portions thereof located within said openings.

9. A gear-case member comprising an open trough of varying depth having a closed-in end portion the top and bottom of which are provided with alined openings and wearing plates having portions thereof located within said openings and projecting into said end portions, and spacing members maintained in alinement with said openings by the projecting portions of said plates.

10. A gear-case member comprising a one-piece trough portion of sheet-metal, the said trough being of varying depth and having relatively shallow end portions the end walls of which are provided with longitudinally extending flanges, corresponding portions of the side walls of said end portions extending inwardly toward each other, portions of the ends walls and their flanges extending over to engage the said inwardly extending portions and to close the said end portions, said end portions being provided with alined openings in the top and bottom thereof, wearing plates having portions thereof located within said openings and projecting into said end portions and spacing members maintained in alinement with said openings by the projecting portions of said plates.

11. A gear-case member comprising a one-piece trough portion of varying depth and having relatively shallow end portions the end walls of which are provided with longitudinally extending flanges, corresponding portions of the side walls of said end portions extending inwardly toward each other, portions of the end walls and their flanges extending over to engage the said inwardly extending portions and to close the said end portions and a spacing member located within said end portions for preventing relative movement between the top and bottom thereof.

In testimony whereof, I have hereunto subscribed my name this 14th day of July, 1917.

ALEXIS R. PRIBIL.